US012175925B2

(12) United States Patent
Watsuda

(10) Patent No.: US 12,175,925 B2
(45) Date of Patent: Dec. 24, 2024

(54) PIXEL CIRCUIT FOR A DISPLAY DEVICE WHICH HAS A COMPENSATION CIRCUIT FOR COLOR SHIFT ISSUE

(71) Applicant: Innolux Corporation, Miao-Li County (TW)

(72) Inventor: Hirofumi Watsuda, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/330,374

(22) Filed: Jun. 7, 2023

(65) Prior Publication Data

US 2023/0316995 A1 Oct. 5, 2023

Related U.S. Application Data

(63) Continuation of application No. 17/027,711, filed on Sep. 22, 2020, now abandoned.

(51) Int. Cl.

| | |
|---|---|
| ***G09G 3/32*** | (2016.01) |
| ***G09G 3/20*** | (2006.01) |
| ***G09G 3/30*** | (2006.01) |
| ***G09G 3/3208*** | (2016.01) |
| ***G09G 3/3225*** | (2016.01) |
| ***G09G 3/3233*** | (2016.01) |

(52) U.S. Cl.

CPC ............. *G09G 3/32* (2013.01); *G09G 3/2003* (2013.01); *G09G 3/30* (2013.01); *G09G 3/3208* (2013.01); *G09G 3/3225* (2013.01); *G09G 3/3233* (2013.01); *G09G 2300/0439* (2013.01); *G09G 2300/0452* (2013.01); *G09G 2300/08* (2013.01); *G09G 2300/0809* (2013.01); *G09G 2310/0262* (2013.01); *G09G 2320/0242* (2013.01)

(58) Field of Classification Search

CPC .......... G09G 3/2003; G09G 3/30; G09G 3/32; G09G 3/3208; G09G 3/3225; G09G 3/3233; G09G 2300/0439; G09G 2300/0452; G09G 2300/08; G09G 2300/0809; G09G 2320/0242; G09G 2310/0262

USPC .................................................... 345/690, 76

See application file for complete search history.

(56) References Cited

U.S. PATENT DOCUMENTS 7,221,337 B1 * 5/2007 Choi ...................... H10K 59/35 257/E27.111
7,675,232 B2 * 3/2010 Kawachi .............. G09G 3/3233 313/506

(Continued)

*Primary Examiner* — Jason M Mandeville
(74) *Attorney, Agent, or Firm* — JCIPRNET

(57) ABSTRACT

A display device including a pixel circuit is provided. The pixel circuit includes a first sub-pixel circuit, a second sub-pixel circuit, and a third sub-pixel circuit. The first sub-pixel circuit and the third sub-pixel circuit are separated by the second sub-pixel circuit. The pixel circuit further includes a first data line, a second data line which are separated from each other. A first gate terminal of a first driving transistor of the first sub-pixel circuit is electrically connected to a second gate terminal of a third driving transistor of the second sub-pixel circuit. A first terminal of a switch circuit of the second sub-pixel circuit is electrically connected to the first gate terminal of the first driving transistor of the first sub-pixel circuit. A second terminal of the switch circuit of the second sub-pixel circuit is electrically connected to the second data line.

7 Claims, 11 Drawing Sheets

(56) References Cited

U.S. PATENT DOCUMENTS

| | | | | |
|---|---|---|---|---|
| 2013/0300639 A1* | 11/2013 | Kim | ..................... | G09G 3/3233<br>257/89 |
| 2019/0164502 A1* | 5/2019 | Yoon | .................... | H10K 59/353 |

* cited by examiner

PIXEL CIRCUIT FOR A DISPLAY DEVICE WHICH HAS A COMPENSATION CIRCUIT FOR COLOR SHIFT ISSUE

CROSS-REFERENCE TO RELATED APPLICATION

This application is a continuation application of and claims the priority benefit of a prior application Ser. No. 17/027,711, filed on Sep. 22, 2020. The entirety of the above-mentioned patent application is hereby incorporated by reference herein and made a part of this specification.

BACKGROUND

Technical Field

The invention relates to a device, more specifically, to a display device.

Description of Related Art

A light-emitting device (LED) display apparatus includes a plurality of pixels, and each of the pixels may include three sub-pixels of red LED, green LED and blue LED. The red LED, the green LED and the blue LED are respectively driven by different driving currents. In the LED display apparatus, gray levels of the light emitted from the LEDs are controlled by the driving currents. However, color shift issue may be generated due to the variation of the driving currents. Taking the green LED for example, as the driving current of the green LED increases, the color of the green light may be shifted, such that the color of the green light becomes bluish. On the contrary, as the driving current of the green LED decreases, the color of the green light may also be shifted, such that the color of the green light becomes reddish.

In the related art, to solve the color shift issue, the display data is processed with a data processing circuit outside of the LED panel in advance and then inputted to the LED panel to drive the pixels. However, it may reduce the range of the gray level control or degrade the accuracy of the gray level control for the relevant primary color.

SUMMARY

The invention is directed to a display device, which includes a compensation circuit for color shift issue.

In an embodiment of the invention, a display device includes a pixel circuit. The pixel circuit includes a first sub-pixel circuit, a second sub-pixel circuit, a third sub-pixel circuit, a first data line, a second data line. The first sub-pixel circuit and the third sub-pixel circuit are separated by the second sub-pixel circuit. The first sub-pixel circuit includes a first driving transistor, a second driving transistor, and a first light-emitting unit electrically connected to the first driving transistor and the second driving transistor. The second sub-pixel circuit includes a third driving transistor, a switch circuit, and a second light-emitting unit electrically connected to the third driving transistor. The third sub-pixel circuit includes a third light-emitting unit. The first light-emitting unit, the second light-emitting unit and the third light-emitting unit emit different colors. The first data line, the second data line are separated from each other. The first data line provides a first data voltage to a gate terminal of second driving transistor. The first second data line provides a second data voltage to a gate terminal of the third driving transistor. A first gate terminal of a first driving transistor of the first sub-pixel circuit is electrically connected to a second gate terminal of the third driving transistor of the second sub-pixel circuit. A first terminal of the switch circuit of the second sub-pixel circuit is electrically connected to the first gate terminal of the first driving transistor of the first sub-pixel circuit. A second terminal of the switch circuit of the second sub-pixel circuit is electrically connected to the second data line.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term “coupling/coupled” or “connecting/connected" used in this specification (including claims) of the application may refer to any direct or indirect connection means. For example, "a first transistor is connected to a second transistor" should be interpreted as "the first transistor is directly connected to the second transistor" or "the first transistor is indirectly connected to the second transistor through other devices or connection means." The term "signal" can refer to a current, a voltage, a charge, a temperature, data, electromagnetic wave or any one or multiple signals. In addition, the term "and/or" can refer to "at least one of". For example, "a first signal and/or a second signal" should be interpreted as "at least one of the first signal and the second signal".

Figure 1:
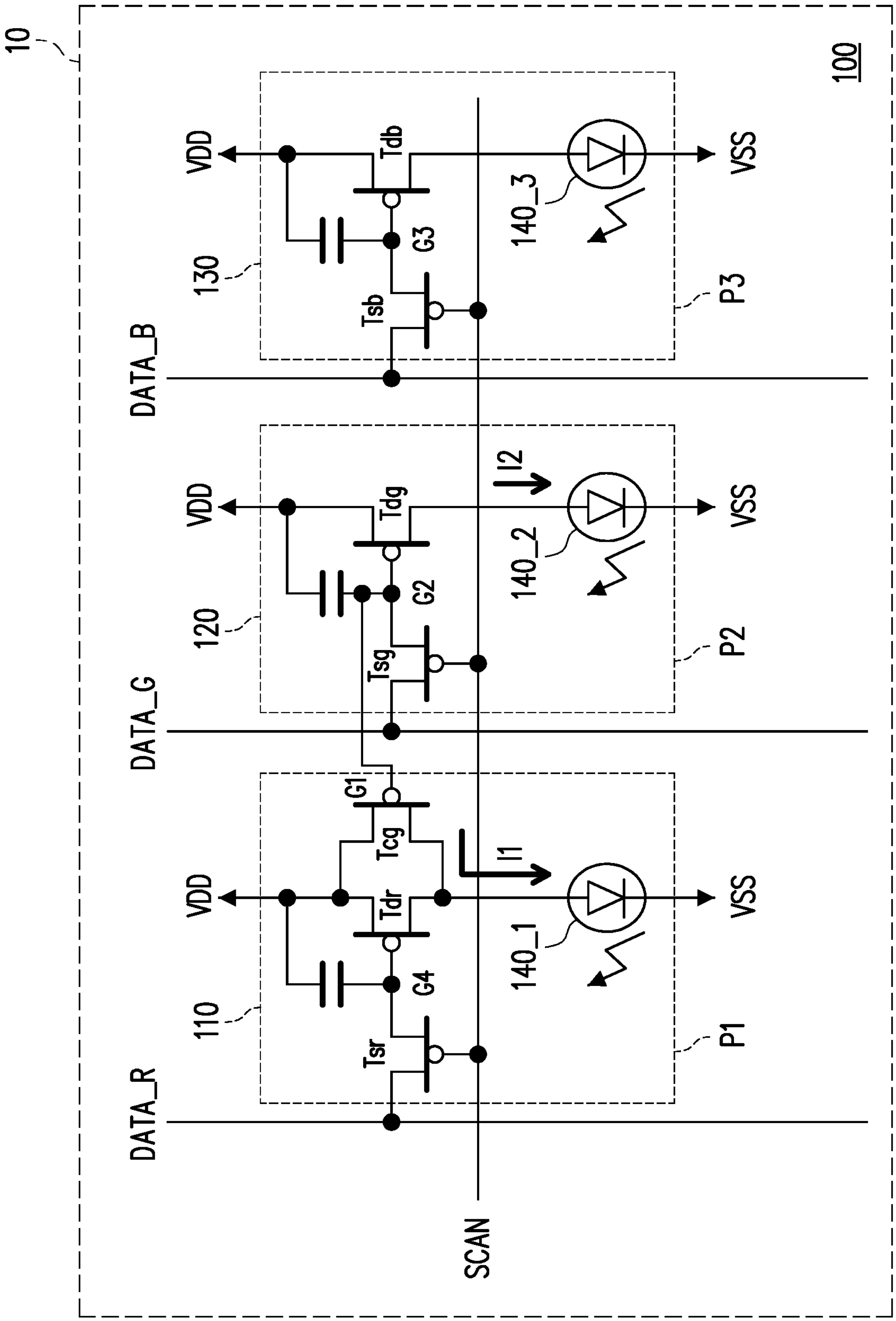
FIG. 1 is a schematic diagram illustrating a display device according to an embodiment of the invention.

FIG. 1 is a schematic diagram illustrating a display device according to an embodiment of the invention. The display device 10 can include a pixel circuit 100. The pixel circuit 100 can include a plurality of subpixels. For simplicity, FIG. 1 only shows that the pixel circuit 100 includes three subpixels P1, P2, and P3, but the invention is not limited thereto. Referring to FIG. 1, the pixel circuit 100 of the present embodiment includes a first sub-pixel circuit 110, a second sub-pixel circuit 120 and a third sub-pixel circuit 130. In the present embodiment, the first sub-pixel circuit 110 is disposed in a first sub-pixel P1 and the first sub-pixel P1 can display red, the second sub-pixel circuit 120 is disposed in a second sub-pixel P2 and the second sub-pixel P2 can display green, and the third sub-pixel circuit 130 is disposed in a third sub-pixel P3 and the third sub-pixel P3 can display blue, but the invention is not limited thereto. The display device 10 can be an OLED display device, a mini LED display device, a micro LED display device, a quantum dot LED display device, an LCD display device, a tiled display device, or a foldable display device.

The first sub-pixel circuit 110 includes two driving transistors Tcg and Tdr (a first driving transistor and a second driving transistor) and a first light-emitting unit 140_1. The first driving transistor Tcg is electrically connected in parallel with the second driving transistor Tdr. The first driving transistor Tcg can have a first channel width and a first channel length, the second driving transistor Tdr can have a second channel width and a second channel length, and the third driving transistor Tdg can have a third channel width and a third channel length. In some embodiments, the channel width-to-length ratio (W/L) of the first driving transistor Tcg may be set to be smaller than the channel width-to-length ratio of the second driving transistor Tdr. That is, a ratio of the first channel width to the first channel length is smaller than a ratio of the second channel width to the second channel length. In some embodiments, the channel width-to-length ratio (W/L) of the first driving transistor Tcg may be set to be smaller than the channel width-to-length ratio of the third driving transistor Tdg. That is, a ratio of the first channel width to the first channel length is smaller than a ratio of the third channel width to the third channel length. The first light-emitting unit 140_1 is electrically connected to the two driving transistors Tcg and Tdr. The second sub-pixel circuit 120 includes a third driving transistor Tdg and a second light-emitting unit 140_2. The second light-emitting unit 140_2 is electrically connected to the third driving transistor Tdg. The third sub-pixel circuit 130 includes a driving transistor Tdb and a third light-emitting unit 140_3. The third light-emitting unit 140_3 is electrically connected to the driving transistor Tdb.

In the present embodiment, the first sub-pixel circuit 110 includes a compensation circuit for color shift issue. The first driving transistor Tcg may serve as the compensation circuit to compensate color shift of a green light, for example. A voltage level of a first gate terminal G1 of the first driving transistor Tcg (one of the two driving transistors) of the first sub-pixel circuit 110 can be associated with a voltage level of a second gate terminal G2 of the third driving transistor Tdg of the second sub-pixel circuit 120. This means that the voltage level of the first gate terminal G1 of the first driving transistor Tcg can be varied or adjusted according to the voltage level of the second gate terminal G2 of the third driving transistor Tdg. Alternatively, the voltage level of the second gate terminal G2 of the third driving transistor Tdg can be varied or adjusted according to the voltage level of the first gate terminal G1 of the first driving transistor Tcg. The variation or adjustment of the voltage level of the first gate terminal G1 or the second gate terminal G2 can be made by circuit design or by a lookup table. The lookup table can be made, for example, according to the desired color compensation and the desired compensation current I1 generated by the first driving transistor Tcg, but the invention is not limited thereto. According to some embodiments, the lookup table can be made by the following parameters, including the channel W/L ratios of the first driving transistor Tcg and the third driving transistor Tdg, the voltages applied to the first gate terminal G1 and the second gate terminal G2, the voltages applied to the source terminal of the first driving transistor Tcg and to the source terminal of the third driving transistor Tdg, or combinations thereof.

As shown in FIG. 1, in the present embodiment, the first gate terminal G1 can be electrically connected to the second gate terminal G2. In this case, by the circuit design, the voltage level of the first gate terminal G1 can be adjusted to be associated with the voltage level of the second gate terminal G2. For example, the voltage level of the first gate terminal G1 can be the same as the voltage level of the second gate terminal G2. To be specific, the first sub-pixel circuit 110 further includes a third switch circuit Tsr. A first terminal (for example, a source terminal) of the first driving transistor Tcg is electrically connected to a first system voltage VDD, and a second terminal (for example, a drain terminal) of the first driving transistor Tcg is electrically connected to the first light-emitting unit 140_1. The first system voltage VDD may be a common power supply of a high voltage. In the present embodiment, the first light-emitting unit 140_1 may include a light-emitting diode for emitting a red light, e.g. a red LED, and the second terminal of the first driving transistor Tcg is electrically connected to an anode terminal of the light-emitting diode. The first gate terminal G1 of the first driving transistor Tcg is electrically connected to the second gate terminal G2 of the third driving transistor Tdg. A first terminal of the second driving transistor Tdr is electrically connected to the first system voltage VDD, and a second terminal of the second driving transistor Tdr is electrically connected to the first light-emitting unit 140_1. A fourth gate terminal G4 of the second driving transistor Tdr is electrically connected to the third switch circuit Tsr. A first terminal of the third switch circuit Tsr is electrically connected to the fourth gate terminal G4 of the second driving transistor Tdr, and second terminal of the third switch circuit Tsr is electrically connected to a first data line DATA_R. A control terminal of the third switch circuit Tsr is electrically connected to a scan line SCAN.

On the other hand, the second sub-pixel circuit 120 further includes a second switch circuit Tsg. A first terminal of the third driving transistor Tdg is electrically connected to the first system voltage VDD, and a second terminal of the third driving transistor Tdg is electrically connected to the second light-emitting unit 140_2. In the present embodiment, the second light-emitting unit 140_2 may include a light-emitting diode for emitting a green light, e.g. a green LED, and the second terminal of the third driving transistor Tdg is electrically connected to an anode terminal of the light-emitting diode. The second gate terminal G2 of the third driving transistor Tdg is electrically connected to the second switch circuit Tsg A first terminal of the second switch circuit Tsg is electrically connected to the second gate terminal G2 of the third driving transistor Tdg, and a second terminal of the second switch circuit Tsg is electrically connected to a second data line DATA_G. A control terminal of the second switch circuit Tsg is electrically connected to the scan line SCAN.

In the present embodiment, the first driving transistor Tcg is electrically connected in parallel with the second driving transistor Tdr in the first sub-pixel circuit 110. When the scan line SCAN turns on the second switch circuit Tsg, a data voltage applied to the second data line DATA_G turns on the first driving transistor Tcg and the third driving transistor Tdg. Accordingly, the third driving transistor Tdg outputs a driving current I2 to drive the green LED 140_2 to emit a green light. On the other hand, the first driving transistor Tcg outputs a compensation current I1 to drive the red LED 140_1. According to some embodiments, the driving current can be controlled by the driving transistor. For example, a ratio of the first channel width to the first channel length of the first driving transistor Tcg can be made smaller than a ratio of the third channel width to the third channel length of the third driving transistor Tdg. Thus, the first driving transistor Tcg can generate a first driving current I1 to drive the red LED 140_1, the third driving transistor Tdg can generate a second driving current I2 to drive the green LED 140_2, and the first driving current I1 can be made smaller than the second driving current I2. Thus, due to the smaller first driving current I1, the red LED 140_1 is slightly lighted up to emit a red light to compensate color shift of a green light. In some embodiment, the first driving transistor Tcg can drive the light-emitting unit of a first color (LED 140_1) with a specified amount of the compensation current I1 to compensate the color shift of the light-emitting unit of a second color (LED 140_2).

In addition, the third sub-pixel circuit 130 further includes a switch circuit Tsb. A first terminal of the driving transistor Tdb is electrically connected to the first system voltage VDD, and a second terminal of the driving transistor Tdb is electrically connected to the third light-emitting unit 140_3. In the present embodiment, the third light-emitting unit 140_3 may include a light-emitting diode for emitting a blue light, e.g. a blue LED, and the second terminal of the driving transistor Tdb is electrically connected to an anode terminal of the light-emitting diode. The third gate terminal G3 of the driving transistor Tdb is electrically connected to the switch circuit Tsb. A first terminal of the switch circuit Tsb is electrically connected to the third gate terminal G3 of the driving transistor Tdb, and a second terminal of the switch circuit Tsb is electrically connected to a third data line DATA_B. A control terminal of the switch circuit Tsb is electrically connected to the scan line SCAN.

In the present embodiment, the LED may include, for example, an organic light emitting diode (OLED), a mini LED, a micro LED, or a quantum dot light emitting diode (e.g., QLED, QDLED), fluorescence, a phosphor, or other suitable materials, or any arrangement and combination thereof, but the invention is not limited thereto.

Figure 3:
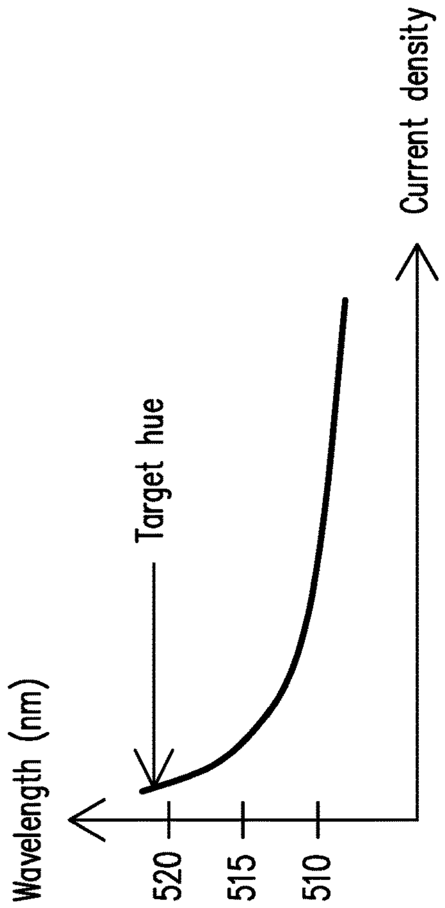
FIG. 3 is a schematic diagram illustrating a relationship between a current density and a wavelength of the green LED according to an embodiment of the invention.
Figure 2:
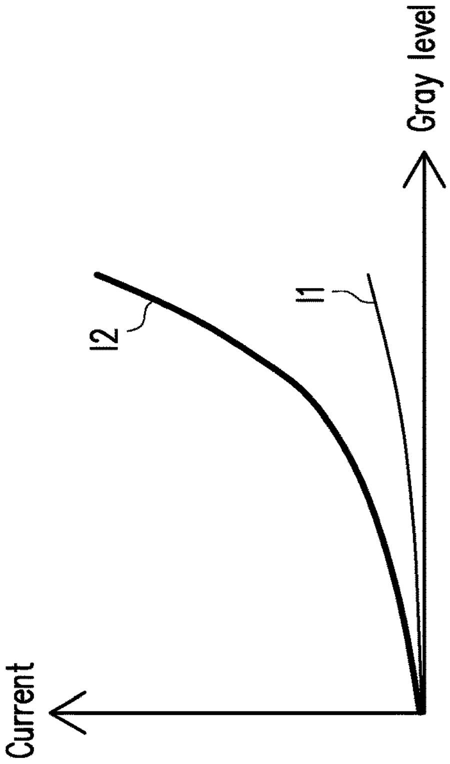
FIG. 2 is a schematic diagram illustrating a relationship between a driving current and a gray level of the green LED according to an embodiment of the invention.
Figure 4:
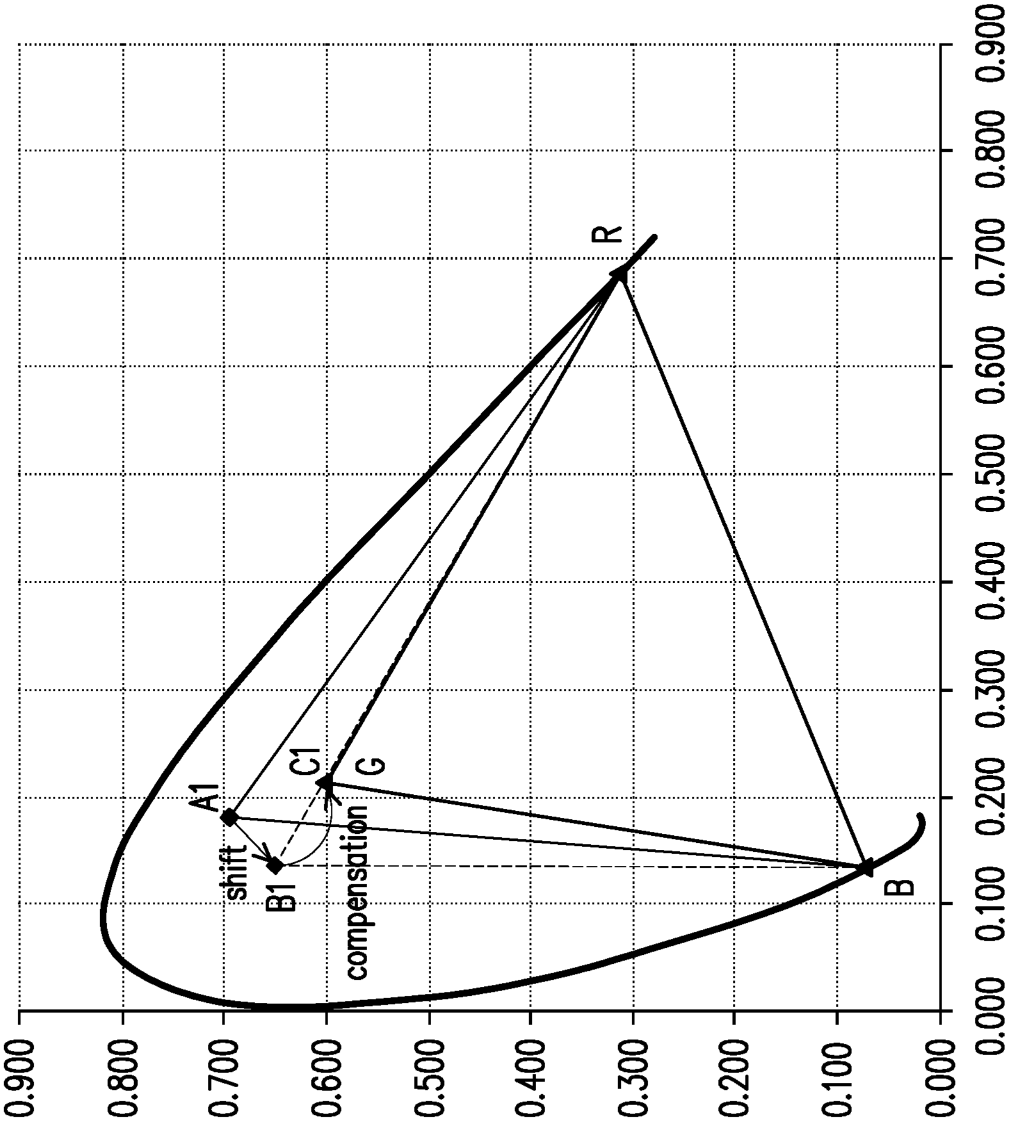
FIG. 4 is a chromaticity diagram illustrating a location of a color point corresponding to the light emitted from the light-emitting units according to an embodiment of the invention.

FIG. 2 is a schematic diagram illustrating a relationship between a driving current and a gray level of the green LED according to an embodiment of the invention. FIG. 3 is a schematic diagram illustrating a relationship between a current density and a wavelength of the green LED according to an embodiment of the invention. FIG. 4 is a chromaticity diagram illustrating a location of a color point corresponding to the light emitted from the light-emitting units according to an embodiment of the invention.

Referring to FIG. 1 to FIG. 4, as the driving current I2 of the green LED 140_2 increases, the color point A1 may shift to the color point B1, and thus the color point A1 has a low gray level and the color point B1 has a high gray level. Accordingly, the color of the green light emitted from the light-emitting units becomes bluish as illustrated in FIG. 4. That is to say, the color shift issue is generated since the driving current I2 of the green LED 140_2 increases.

To solve the color shift issue, the driving transistor Tcg is added to the first sub-pixel circuit 110 to serve as the compensation circuit. The driving transistor Tcg automatically lights up the red LED 140_1 with a specified amount of the compensation current I1 to compensate color shift of the green light and keep the wavelength of the green light the same as the dominant wavelength of 520 nanometer (nm). The value of the compensation current I1 increases along with the gray level, and the maximum value locates in the high gray level. In the present embodiment, the target hue is, for example, a green hue corresponding to the dominant wavelength of 520 nm, as illustrated in FIG. 3. The channel width-to-length ratio (W/L) of the driving transistor Tcg may be set to control the wavelength of the green light emitted from the light-emitting units to be kept the same as the dominant wavelength. Accordingly, the color point B1 may be changed to the color point C1 after compensation, and the wavelength of the green light of the color points A1 and C1 is consistent with the dominant wavelength.

In an embodiment, the first sub-pixel circuit 110 may display green, the second sub-pixel circuit 120 may display blue, and the third sub-pixel circuit 130 may display red. In this case, the driving transistor Tcg may automatically light up a green LED of the first sub-pixel circuit 110 to compensate a color shift of the blue light.

Figure 5:
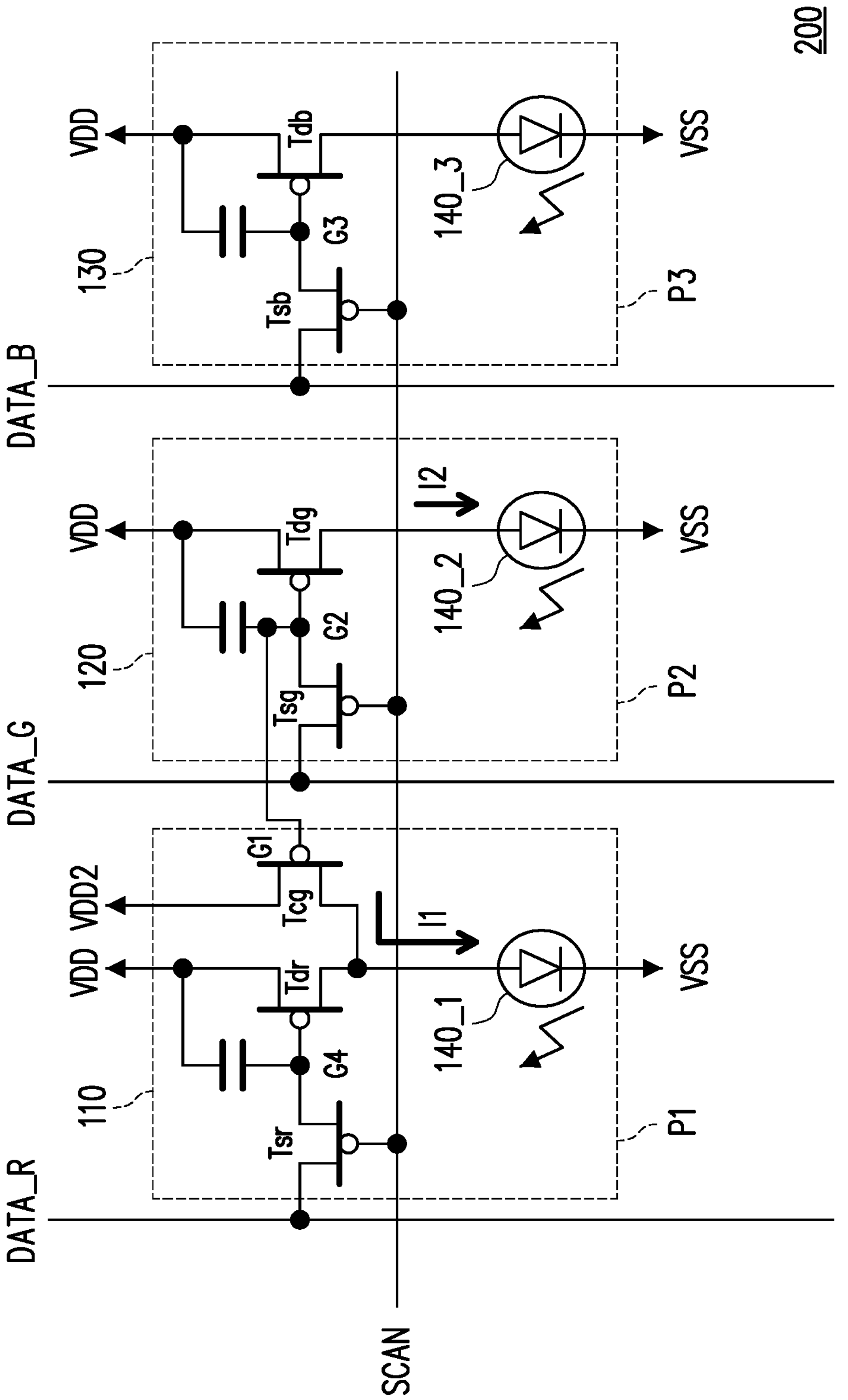
FIG. 5 is a schematic diagram illustrating a circuit for driving light-emitting units according to another embodiment of the invention.

FIG. 5 is a schematic diagram illustrating a circuit for driving light-emitting units according to another embodiment of the invention. Referring to FIG. 1 and FIG. 5, the circuit 200 of the present embodiment is similar to the circuit 100 depicted in FIG. 1, and the main difference therebetween, for example, lies in that a first terminal of the first driving transistor Tcg is electrically connected to a second system voltage VDD2. The second system voltage VDD2 can be different from the first system voltage VDD. That is to say, the first and second driving transistors Tcg and Tdr of the first sub-pixel circuit 110 are connected to different system voltages VDD and VDD2. According to some embodiments, the second system voltage VDD2 can be smaller than the first system voltage VDD1. Thus, the driving current I1 can be adjusted to be smaller than the driving current I2. As a result, the driving current I1 for compensation will not be too great, and the dominant wavelength or color in the second sub-pixel 120 can be maintained.

In the present embodiment, the second system voltage VDD2 and the channel width-to-length ratio of the driving transistor Tcg may be set to control the wavelength of the green light emitted from the light-emitting units to be kept the same as the dominant wavelength.

Figure 6:
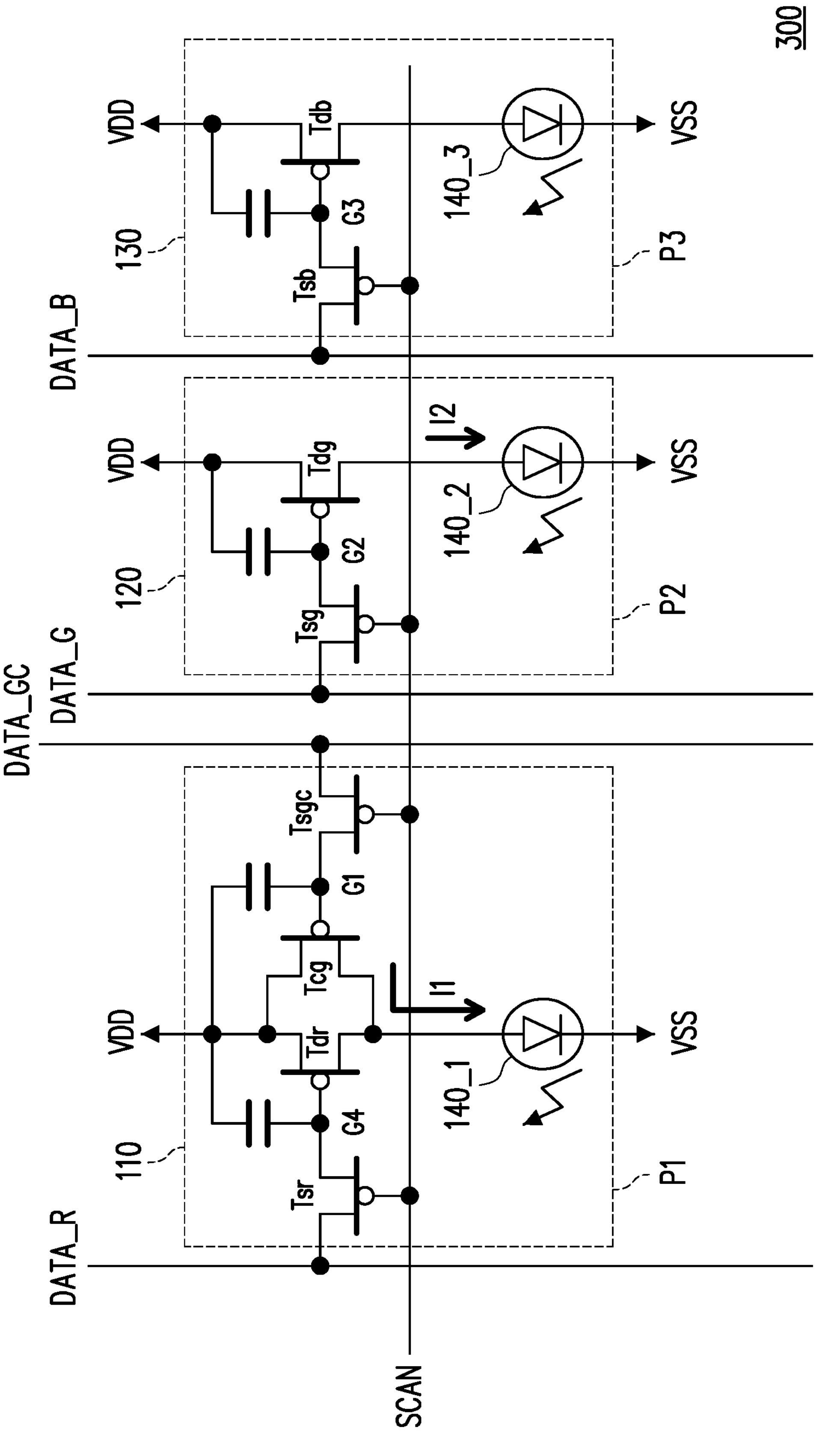
FIG. 6 is a schematic diagram illustrating a circuit for driving light-emitting units according to another embodiment of the invention.

FIG. 6 is a schematic diagram illustrating a circuit for driving light-emitting units according to another embodiment of the invention. Referring to FIG. 1 and FIG. 6, the circuit 300 of the present embodiment is similar to the circuit 100 depicted in FIG. 1, and the main difference therebetween, for example, lies in that the first sub-pixel circuit 110 of the circuit 300 further includes a first switch circuit Tsgc.

To be specific, a first terminal of the first driving transistor Tcg is electrically connected to the first system voltage VDD, and a second terminal of the first driving transistor Tcg is electrically connected to the first light-emitting unit 140_1. The first gate terminal G1 of the first driving transistor Tcg is electrically connected to the first switch circuit Tsgc. A first terminal of the second driving transistor Tdr is electrically connected to the first system voltage VDD, and a second terminal of the second driving transistor Tdr is electrically connected to the first light-emitting unit 140_1. A fourth gate terminal G4 of the second driving transistor Tdr is electrically connected to the third switch circuit Tsr.

A first terminal of the third switch circuit Tsr is electrically connected to the first gate terminal G1 of the second driving transistor Tdr, and a second terminal of the third switch circuit Tsr is electrically connected to a first data line DATA_R. A control terminal of the third switch circuit Tsr is electrically connected to a scan line SCAN. A first terminal of the first switch circuit Tsgc is electrically connected to a third data line DATA_GC, and a second terminal of the first switch circuit Tsgc is electrically connected to the first gate terminal G1 of the first driving transistor Tcg. A control terminal of the first switch circuit Tsgc is electrically connected to the scan line SCAN.

On the other hand, a first terminal of the third driving transistor Tdg is electrically connected to the first system voltage VDD, and a second terminal of the third driving transistor Tdg is electrically connected to the second light-emitting unit 140_2. The second gate terminal G2 of the third driving transistor Tdg is electrically connected to the second switch circuit Tsg. A first terminal of the second switch circuit Tsg is electrically connected to the second gate terminal G2 of the third driving transistor Tdg, and a second terminal of the second switch circuit Tsg is electrically connected to a second data line DATA_G. A control terminal of the second switch circuit Tsg is electrically connected to the scan line SCAN.

As illustrated in FIG. 6, the first gate terminal G1 of the driving transistors Tcg is electrically connected to the first switch circuit Tsgc, and the second gate terminal G2 of the driving transistor Tdg is electrically connected to the second switch circuit Tsg. The first switch circuit Tsgc and the second switch circuit Tsg are respectively connected to two independent data lines DATA_GC and DATA_G. The two data lines DATA_GC and DATA_G respectively provide two associated data voltages to the first gate terminal G1 of the driving transistor Tcg and the second gate terminal G2 of the driving transistor Tdg. This means that the data voltage provided by the data line DATA_G can be varied or adjusted according to the data voltage provided by the data line DATA_GC. Alternatively, the data voltage provided by the data line DATA_GC can be varied or adjusted according to the data voltage provided by the data line DATA_G. The variation or adjustment of the data voltage provided by the data line DATA_G or DATA_GC can be made by circuit design or by a lookup table. The lookup table can be made, for example, according to the desired color compensation and the desired compensation current I1 generated by the first driving transistor Tcg, but the invention is not limited thereto. Accordingly, the voltage level of the first gate terminal G1 of the driving transistor Tcg of the first sub-pixel circuit 110 is associated with a voltage level of the second gate terminal G2 of the driving transistor Tdg of the second sub-pixel circuit 120. The data voltage provided by the data line DATA_G may be a data voltage for driving the green LED 140_2 to emit a green light. The data voltage provided by the data line DATA_GC may be a data voltage for driving the red LED 140_1 to emit a red light and for compensating the color shift of the green light and associated with the data voltage provided by the data line DATA_G. The red LED 140_1 and the green LED 140_2 emit different colors, and may have different electro-optical characteristics. Thus, by sharing the same data line DATA_G (without the data line DATA_GC) to drive two LEDs of different colors, the compensation current I1 may not be controlled exactly. In this embodiment, the independent data line DATA_GC is used to drive the red LED 140 for compensation, the compensation current I1 can be controlled more exactly.

In the present embodiment, the data voltage provided by the data line DATA_GC and the channel width-to-length ratio of the driving transistor Tcg may be set to control the wavelength of the green light emitted from the light-emitting units to be kept the same as the dominant wavelength.

Figure 7:
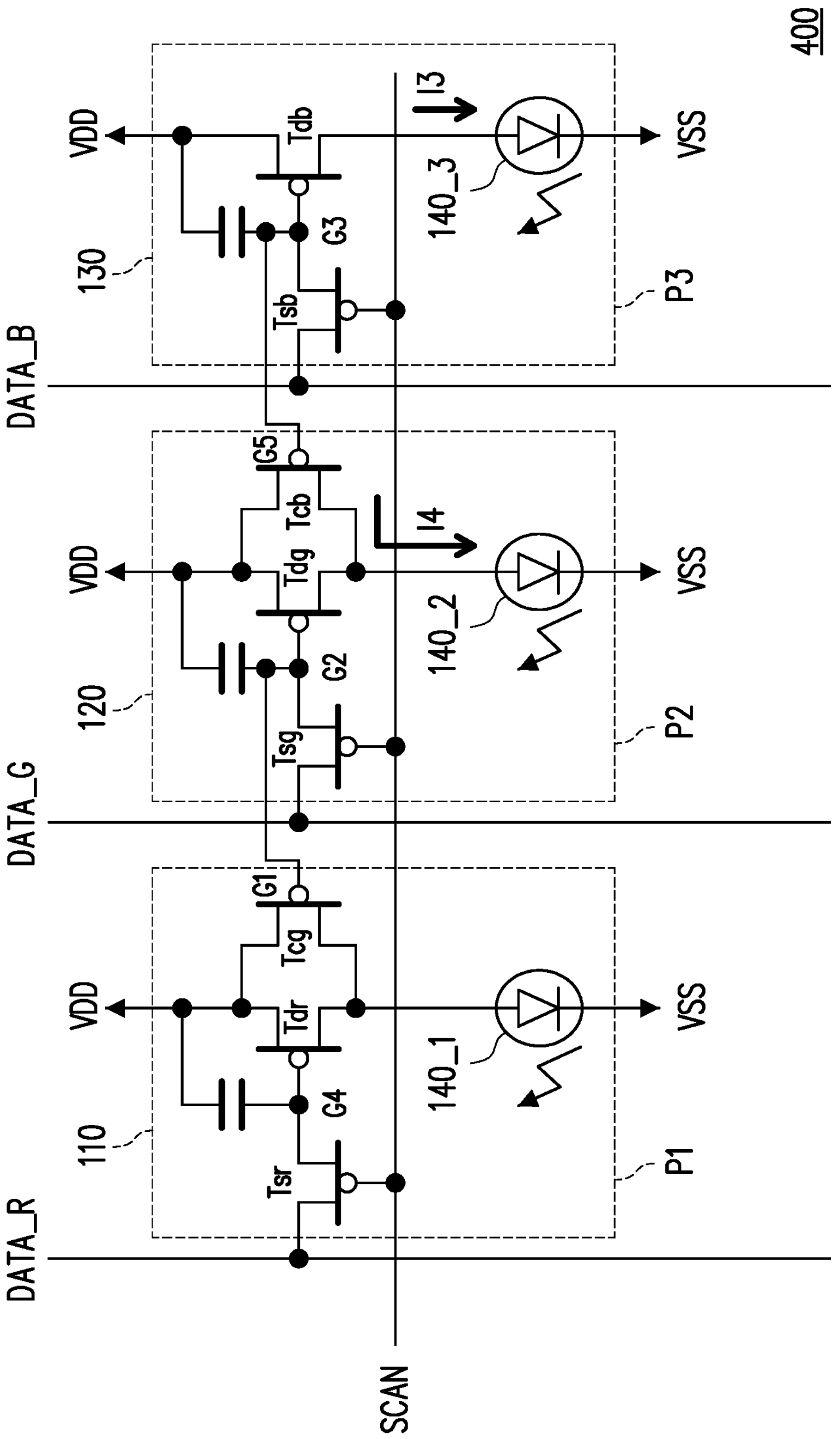
FIG. 7 is a schematic diagram illustrating a circuit for driving light-emitting units according to another embodiment of the invention.

FIG. 7 is a schematic diagram illustrating a circuit for driving light-emitting units according to another embodiment of the invention. Referring to FIG. 1 and FIG. 7, the circuit 400 of the present embodiment is similar to the circuit 100 depicted in FIG. 1, and the main difference therebetween, for example, lies in that the sub-pixel circuit 120 of the circuit 400 further includes a driving transistor Tcb, and the gate terminal G5 is electrically connected to the gate terminal G3 such that the voltage level of the gate terminal G5 is the same as the voltage level of the gate terminal G3. The driving transistor Tcb may serve as the compensation circuit to compensate color shift of a blue light, for example. The driving transistor Tcb automatically lights up the green LED 140_2 with a specified amount of the compensation current I4 to compensate the color shift of the blue light.

In the present embodiment, the channel width-to-length ratio of the driving transistor Tcb may be set to control the wavelength of the blue light emitted from emitted from the light-emitting units to be kept the same as the dominant wavelength of the blue light, e.g. 450 nm.

Figure 8:
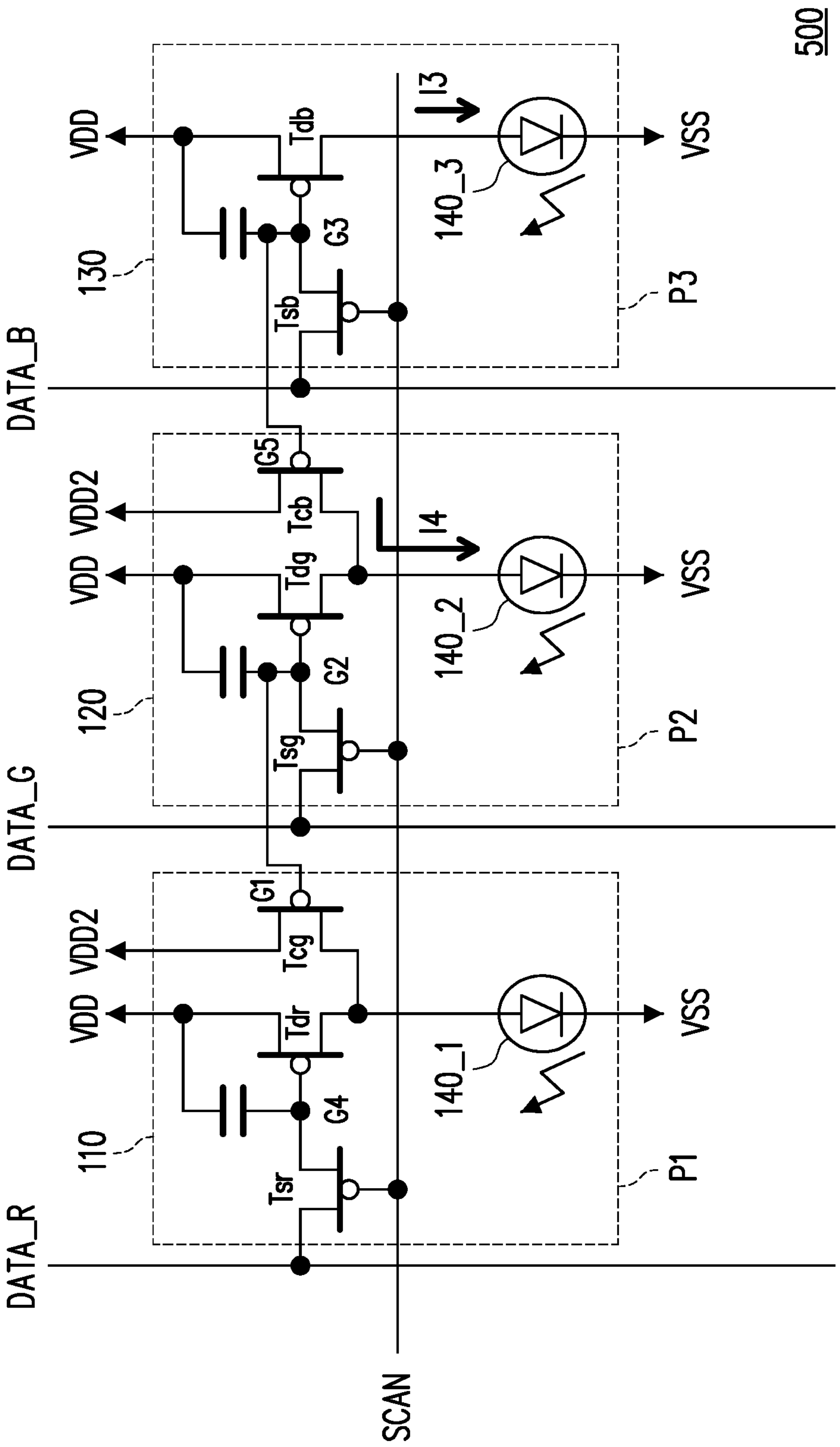
FIG. 8 is a schematic diagram illustrating a circuit for driving light-emitting units according to another embodiment of the invention.

FIG. 8 is a schematic diagram illustrating a circuit for driving light-emitting units according to another embodiment of the invention. Referring to FIG. 7 and FIG. 8, the circuit 500 of the present embodiment is similar to the circuit 400 depicted in FIG. 7, and the main difference therebetween, for example, lies in that the first terminals of the driving transistors Tcg and Tcb are electrically connected to the second system voltage VDD2. In the present embodiment, the second system voltage VDD2 and the channel width-to-length ratio of the driving transistors Tcg and Tcb may be set to control the wavelength of the blue light emitted from the light-emitting units to be kept the same as the dominant wavelength of the blue light.

Figure 9:
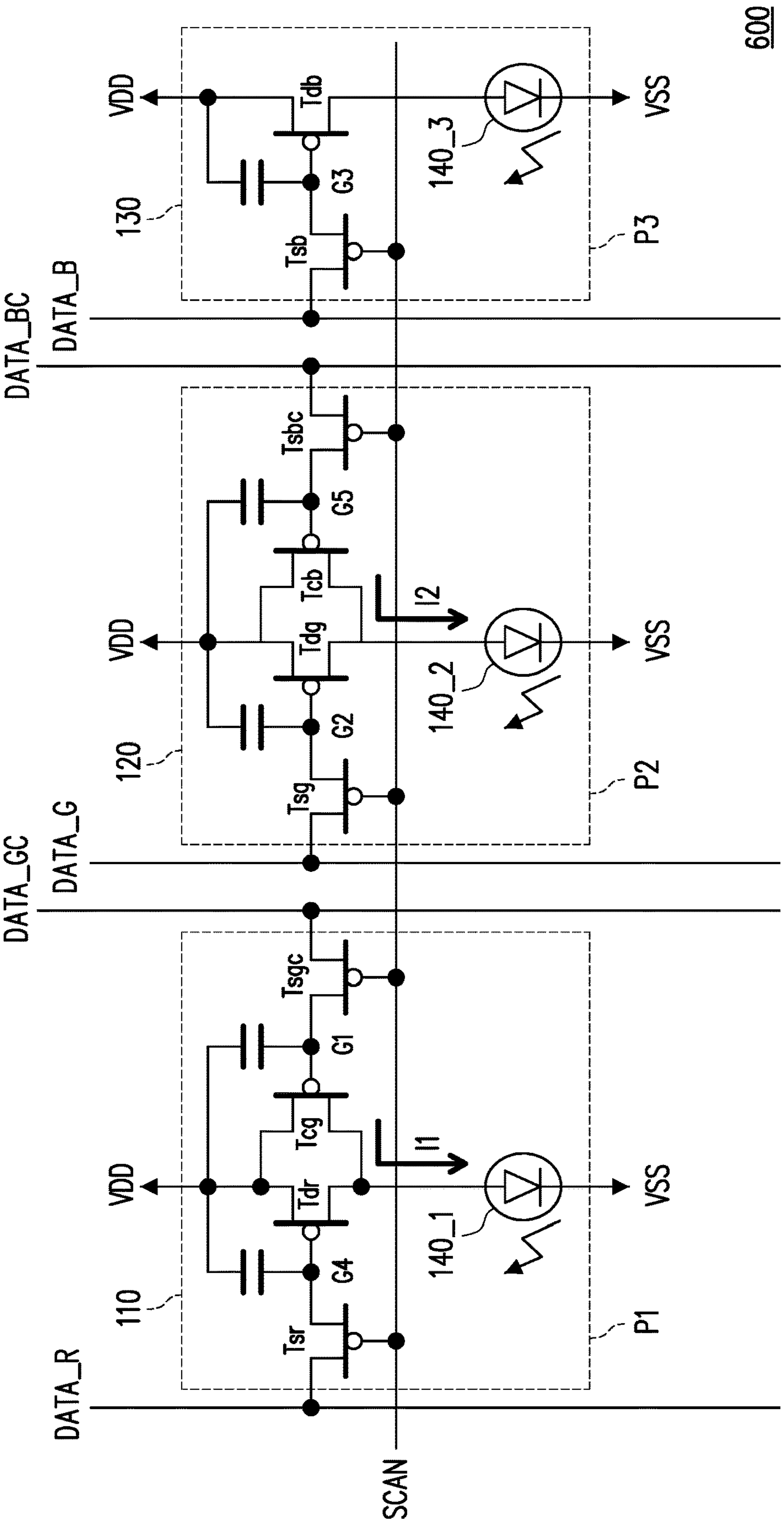
FIG. 9 is a schematic diagram illustrating a circuit for driving light-emitting units according to another embodiment of the invention.

FIG. 9 is a schematic diagram illustrating a circuit for driving light-emitting units according to another embodiment of the invention. Referring to FIG. 6 and FIG. 9, the circuit 600 of the present embodiment is similar to the circuit 300 depicted in FIG. 6, and the main difference therebetween, for example, lies in that the sub-pixel circuit 120 of the circuit 600 further includes a driving transistor Tcb and a switch circuit Tsbc for compensating the color shift of the blue light.

To be specific, a first terminal of the switch circuit Tsbc is electrically connected to a data line DATA_BC, and a second terminal of the switch circuit Tsbc is electrically connected to the fifth gate terminal G5 of the driving transistor Tcb. A control terminal of the switch circuit Tsbc is electrically connected to the scan line SCAN. A first terminal of the switch circuit Tsb is electrically connected to the gate terminal G3 of the driving transistor Tdb, and a second terminal of the switch circuit Tsb is electrically connected to a data line DATA_B. A control terminal of the switch circuit Tsb is electrically connected to the scan line SCAN.

The switch circuit Tsbc and the switch circuit Tsb are respectively connected to two data lines DATA_BC and DATA_B. The two data lines DATA_BC and DATA_B respectively provide two associated data voltages to the gate terminal G5 of the driving transistor Tcb and the gate terminal G3 of the driving transistor Tdb. Accordingly, the voltage level of the gate terminal G5 of the driving transistor Tcb of the sub-pixel circuit 120 is associated with a voltage level of the gate terminal G3 of the driving transistor Tdb of the sub-pixel circuit 130. The data voltage provided by the data line DATA_B may be a data voltage for driving the blue LED 140_3 to emit a blue light. The data voltage provided by the data line DATA_BC may be a data voltage for compensating the color shift of the blue light and associated with the data voltage provided by the data line DATA_B.

In the present embodiment, the data voltage provided by the data line DATA_BC and the channel width-to-length ratio of the driving transistor Tcb may be set to control the wavelength of the blue light emitted from the light-emitting units to be kept the same as the dominant wavelength of the blue light.

In the embodiments of FIG. 7 to FIG. 9, the circuit operation for compensating the color shift of the blue light is sufficiently taught, suggested, and embodied in the embodiments illustrated in FIG. 1 to FIG. 6, and therefore no further description is provided herein.

Figure 10:
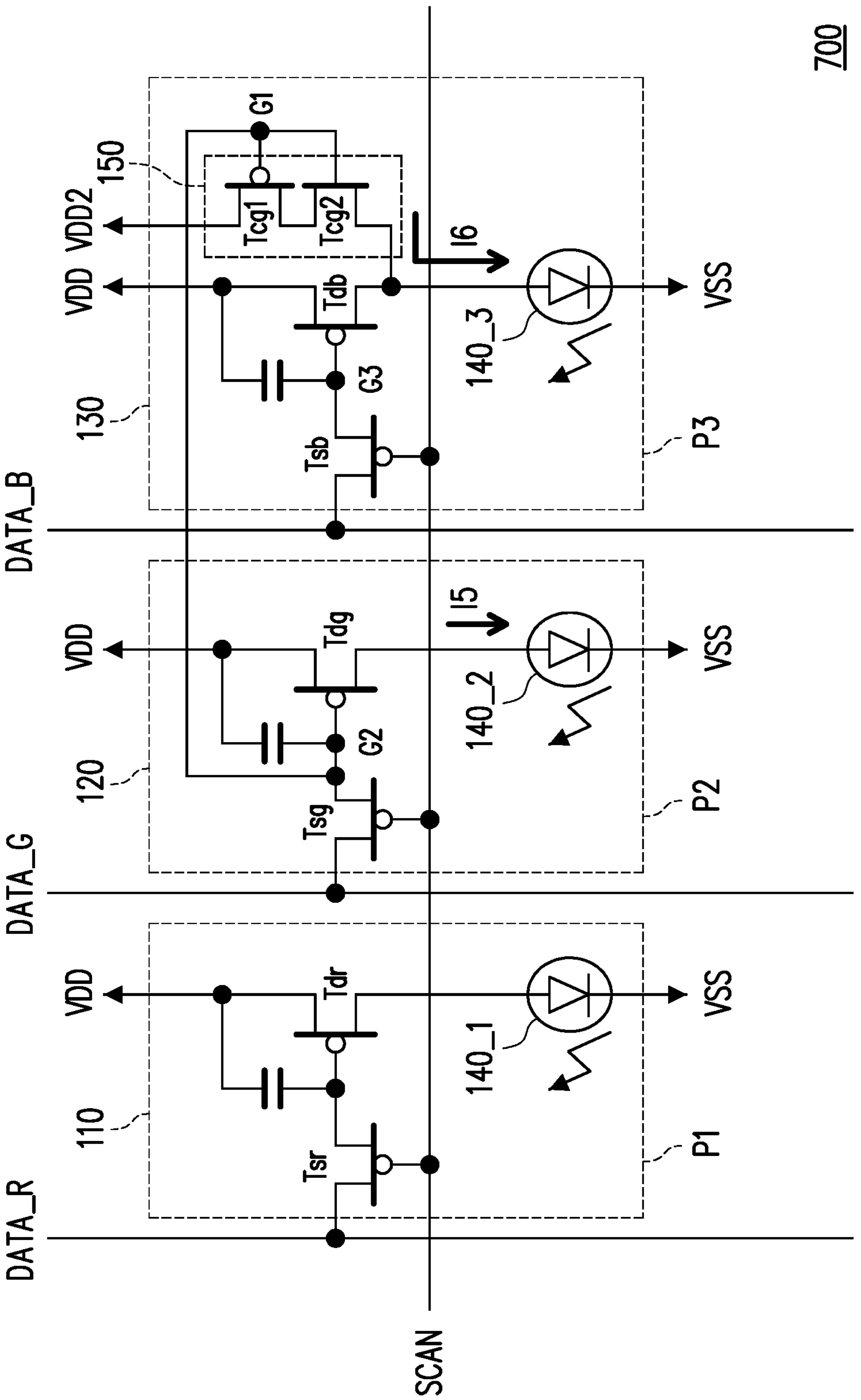
FIG. 10 is a schematic diagram illustrating a circuit for driving light-emitting units according to another embodiment of the invention.

FIG. 10 is a schematic diagram illustrating a circuit for driving light-emitting units according to another embodiment of the invention. Referring to FIG. 10, the circuit 700 of the present embodiment includes the sub-pixel circuits 110, 120 and 130 respectively display red, green and blue, but the invention is not limited thereto. The sub-pixel circuit 130 includes a driving transistor Tdb, a switch circuit Tsb and a compensation circuit 150. The compensation circuit 150 is configured for color shift issue and includes two driving transistors Tcg1 and Tcg2. In the present embodiment, the sub-pixel circuit 120 displays green and serves as the second sub-pixel circuit as mentioned above, and the sub-pixel circuit 130 displays blue and serves as a first sub-pixel circuit as mentioned above. The first sub-pixel circuit 130 includes a compensation circuit for compensating the color shift issue of the green LED 140_2 in the second sub-pixel circuit 120.

To be specific, referring to FIG. 10, a first terminal of the first driving transistor Tcg1 is electrically connected to the second system voltage VDD2, and a second terminal of the first driving transistor Tcg1 is electrically connected to the fourth driving transistor Tcg2. The first gate terminal G1 of the first driving transistor Tcg1 is electrically connected to the second gate terminal G2 of the third driving transistor Tdg. A first terminal of the second driving transistor Tdb is electrically connected to the first system voltage VDD, and a second terminal of the second driving transistor Tdb is electrically connected to the third light-emitting unit 140_3. A third gate terminal G3 of the second driving transistor Tdb is electrically connected to the third switch circuit Tsb. A first terminal of the fourth driving transistor Tcg2 is electrically connected to the second terminal of the first driving transistor Tcg1, and a second terminal of the fourth driving transistor Tcg2 is electrically connected to the third light-emitting unit 140_3. A first gate terminal G1 of the fourth driving transistor Tcg2 is electrically connected to the second gate terminal G2 of the third driving transistor Tdg. A first terminal of the third switch circuit Tsb is electrically connected to the third gate terminal G3 of the second driving transistor Tdb, and a second terminal of the third switch circuit Tsb is electrically connected to a third data line DATA_B. A control terminal of the third switch circuit Tsb is electrically connected to the scan line SCAN. The first system voltage VDD1 and the second system voltage VDD2 can be different, for example, the second system voltage VDD2 can be smaller than the first system voltage VDD 1. Thus, the driving current I6 can be adjusted to be smaller than the driving current I5. As a result, the driving current I6 for compensation will not be too great, and the dominant wavelength or color in the second sub-pixel 120 can be maintained.

On the other hand, a first terminal of the third driving transistor Tdg of the sub-pixel circuit 120 (a second sub-pixel circuit) is electrically connected to the first system voltage VDD, and a second terminal of the third driving transistor Tdg is electrically connected to the second light-emitting unit 140_2. The second gate terminal G2 of the third driving transistor Tdg is electrically connected to the second switch circuit Tsg. A first terminal of the second switch circuit Tsg is electrically connected to the second gate terminal G2 of the third driving transistor Tdg, and a second terminal of the second switch circuit Tsg is electrically connected to a second data line DATA_G. A control terminal of the second switch circuit Tsg is electrically connected to the scan line SCAN.

In the present embodiment, a voltage level of the first gate terminal G1 of the driving transistor Tcg1 is associated with a voltage level of the second gate terminal G2 of the driving transistor Tdg. The first gate terminal G1 is electrically connected to the second gate terminal G2 such that the voltage level of the first gate terminal G1 is the same as the voltage level of the second gate terminal G2. In addition, the first gate terminals G1 of the driving transistors Tcg1 and Tcg2 are electrically connected to the second gate terminal G2 of the driving transistor Tdg such that the voltage level of the first gate terminals G1 of the driving transistors Tcg1 and Tcg2 is the same as the voltage level of the second gate terminal G2 of the driving transistor Tdg.

The first driving transistor Tcg1 and the fourth driving transistor Tcg2 are transistors of different types, and the first driving transistor Tcg1 and the second driving transistor Tdb are transistors of the same type. For example, the first driving transistor Tcg1 and the second driving transistor Tdb may be p-type transistors, and the fourth driving transistor Tcg2 may be an n-type transistor.

Figure 11:
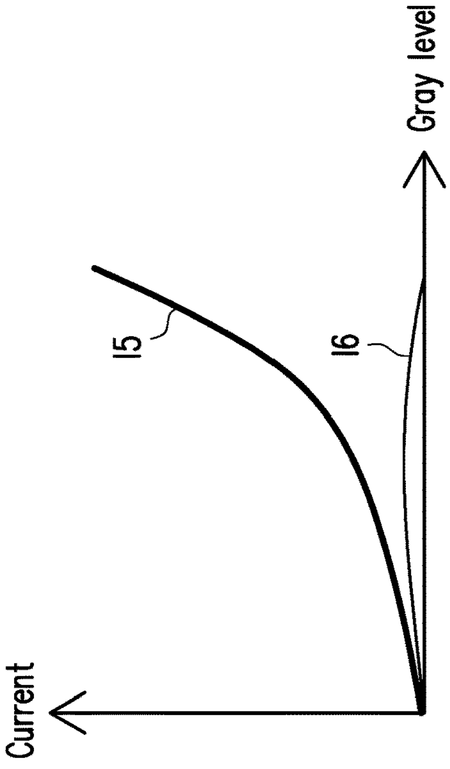
FIG. 11 is a schematic diagram illustrating a relationship between a driving current and a gray level of the green LED according to another embodiment of the invention.
Figure 12:
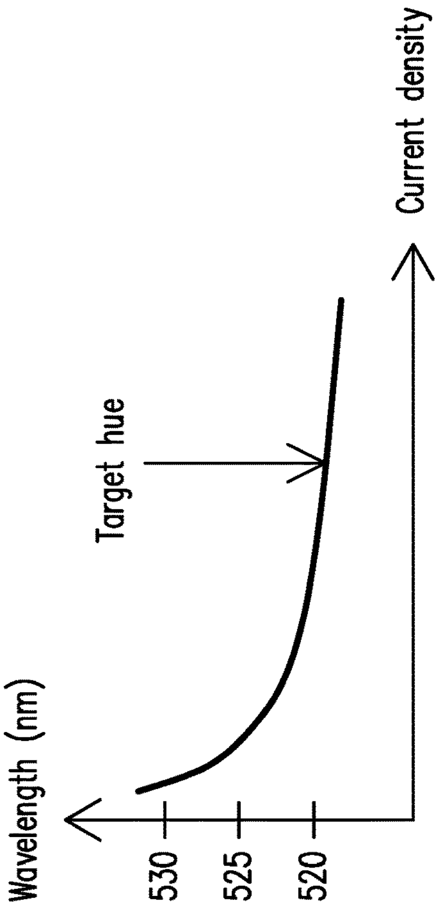
FIG. 12 is a schematic diagram illustrating a relationship between a current density and a wavelength of the green LED according to another embodiment of the invention.
Figure 13:
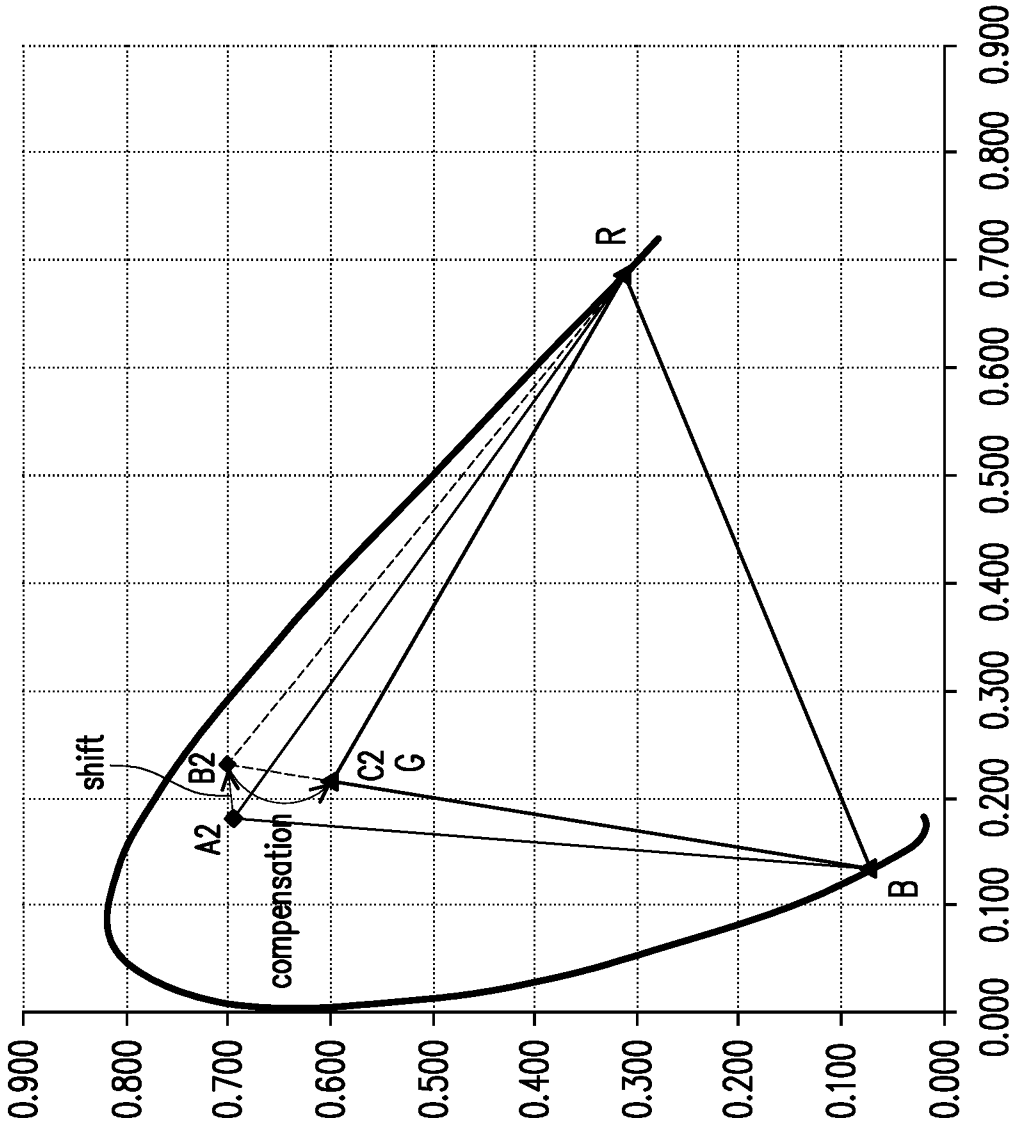
FIG. 13 is a chromaticity diagram illustrating a location of a color point corresponding to the light emitted from the light-emitting units according to another embodiment of the invention.

FIG. 11 is a schematic diagram illustrating a relationship between a driving current and a gray level of the green LED according to another embodiment of the invention. FIG. 12 is a schematic diagram illustrating a relationship between a current density and a wavelength of the green LED according to another embodiment of the invention. FIG. 13 is a chromaticity diagram illustrating a location of a color point corresponding to the light emitted from the light-emitting units according to another embodiment of the invention.

Referring to FIG. 10 to FIG. 13, as the driving current I5 of the green LED 140_2 decreases, the color point A2 may shift to the color point B2, and thus the color point A2 has a high gray level and the color point B2 has a low gray level. Accordingly, the color of the green light emitted from the light-emitting units becomes reddish as illustrated in FIG.

13. That is to say, the color shift issue is generated since the driving current I5 of the green LED 140_2 decreases.

To solve the color shift issue, the driving transistors Tcg1 and Tcg2 are added to the sub-pixel circuit 130 to serve as the compensation circuit. The driving transistors Tcg1 and Tcg2 automatically light up the blue LED 140_3 with a specified amount of the compensation current I6 to compensate color shift of the green light and keep the wavelength of the green light the same as the dominant wavelength of 520 nm. For the compensation current I6, the maximum value locates in a middle gray level, and the minimum value locates in the highest gray level. In the lowest gray level, the compensation current I6 is also the minimum value to control the blue LED 140_3 not to emit lights. In the present embodiment, the target hue is, for example, a green hue corresponding to the dominant wavelength of 520 nm, as illustrated in FIG. 12. The channel width-to-length ratio of the driving transistors Tcg1 and Tcg2 may be separately set to control the wavelength of the green light emitted from the light-emitting units to be kept the same as the dominant wavelength. Accordingly, the color point B2 may be changed to the color point C2 after compensation, and the wavelength of the green light of the color points A2 and C2 is consistent with the dominant wavelength.

In summary, in the embodiments of the invention, to solve the color shift issue, a driving transistor is added to at least one of the sub-pixel circuits to serve as a compensation circuit. The added driving transistor can drive the light-emitting unit of a first color with a specified amount of the compensation current to compensate the color shift of the light-emitting unit of a second color. The system voltage, the data voltage, and the channel width-to-length ratio of the added driving transistor can be set to control the wavelength of the light to be kept the same as the dominant wavelength. Therefore, after compensation, the color shift issue of the light is solved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising a pixel circuit, the pixel circuit comprising:

a first sub-pixel circuit comprising a first driving transistor, a second driving transistor, and a first light-emitting unit electrically connected to the first driving transistor and the second driving transistor;

a second sub-pixel circuit comprising a third driving transistor, a switch circuit, and a second light-emitting unit electrically connected to the third driving transistor;

a third sub-pixel circuit comprising a third light-emitting unit, wherein the first sub-pixel circuit and the third sub-pixel circuit are separated by the second sub-pixel circuit, and the first light-emitting unit, the second light-emitting unit, and the third light-emitting unit emit different colors;

a first data line, providing a first data voltage to a gate terminal of second driving transistor; and a second data line, providing a second data voltage to a first gate terminal of the first driving transistor of the first sub-pixel circuit and a second gate terminal of the third driving transistor of the second sub-pixel circuit; and a scan line, wherein a control terminal of the switch circuit of the second sub-pixel circuit is directly connected to the scan line, a first terminal of the switch circuit of the second sub-pixel circuit is electrically connected to both the first gate terminal of the first driving transistor of the first sub-pixel circuit and the second gate terminal of the third driving transistor of the second sub-pixel circuit, and a second terminal of the switch circuit of the second sub-pixel circuit is electrically connected to the second data line, wherein the first data line and the second data line are separated from each other, wherein the first gate terminal of the first driving transistor of the first sub-pixel circuit is directly electrically connected to the second gate terminal of the third driving transistor of the second sub-pixel circuit, wherein the scan line is configured to turn on the switch circuit of the second sub-pixel circuit for turning on the first driving transistor of the first sub-pixel circuit and the third driving transistor of the second sub-pixel circuit through the second data line, wherein the first driving transistor of the first sub-pixel circuit has a first channel width and a first channel length, the third driving transistor of the second sub-pixel circuit has a third channel width and a third channel length, a ratio of the first channel width to the first channel length is smaller than a ratio of the third channel width and to the third channel length.

2. The display device of claim 1, wherein the third sub-pixel circuit further comprises a driving transistor electrically connected to the third light-emitting unit, and the pixel circuit further comprises:

a third data line, providing a third data voltage to a gate terminal of the driving transistor of the third sub-pixel circuit, and third data line are separated from the first data line and the second data line.

3. The display device of claim 1, wherein the first driving transistor has a first channel width and a first channel length, the second driving transistor has a second channel width and a second channel length, wherein a ratio of the first channel width to the first channel length is smaller than a ratio of the second channel width to the second channel length.

4. The display device of claim 1, wherein the first sub-pixel circuit is disposed in a first sub-pixel, the second sub-pixel circuit is disposed in a second sub-pixel, the first sub-pixel displays red, and the second sub-pixel displays green.

5. The display device of claim 1, wherein both the first gate terminal of first driving transistor and the second gate terminal of the third driving transistor are not electrically connected to any scan line.

6. The display device of claim 1, wherein the first driving transistor of the first sub-pixel circuit and the second driving transistor of the first sub-pixel circuit are electrically connected to different system voltages.

7. The display device of claim 1, wherein the first sub-pixel circuit further comprises a switch circuit, wherein a control terminal of the switch circuit of the first sub-pixel circuit is directly connected to the scan line, a first terminal of the switch circuit of the first sub-pixel circuit is electrically connected to a gate terminal of the second driving transistor of the first sub-pixel circuit, and a second terminal of the switch circuit of the first sub-pixel circuit is electrically connected to the first data line, wherein the scan line is configured to turn on the switch circuit of the first sub-pixel circuit for turning on the second driving transistor of the first sub-pixel circuit through the first data line.

* * * * *